United States Patent
Ruiz Lara et al.

(10) Patent No.: US 12,337,969 B2
(45) Date of Patent: Jun. 24, 2025

(54) BUSINESS CLASS SEATING ARRANGEMENT WITH COMPANION TRAVEL SEATING GROUP

(71) Applicant: B/E Aerospace, Inc., Winston-Salem, NC (US)

(72) Inventors: Oscar Ruiz Lara, Kirkland, WA (US); Travis J. Vaninetti, Bothell, WA (US); Joseph M. Gutosky, Kernersville, NC (US); Travis K Finlay, Winston-Salem, NC (US); Christopher D Adcock, Advance, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 48 days.

(21) Appl. No.: 18/133,325

(22) Filed: Apr. 11, 2023

(65) Prior Publication Data
US 2024/0343392 A1   Oct. 17, 2024

(51) Int. Cl.
B64D 11/06   (2006.01)

(52) U.S. Cl.
CPC ...... B64D 11/0601 (2014.12); B64D 11/0606 (2014.12); B64D 11/0641 (2014.12)

(58) Field of Classification Search
CPC ............ B64D 11/0601; B64D 11/0641; B64D 11/064; B64D 11/0606
See application file for complete search history.

(56) References Cited

U.S. PATENT DOCUMENTS

| | | | |
|---|---|---|---|
| 2,947,349 A | 8/1960 | Kryter | |
| 9,169,020 B2 | 10/2015 | Kroll et al. | |
| 2007/0262625 A1 | 11/2007 | Dryburgh et al. | |
| 2013/0106156 A1* | 5/2013 | Orson | B64D 11/0641 297/217.3 |
| 2015/0166182 A1 | 6/2015 | Ducreux et al. | |
| 2017/0327232 A1 | 11/2017 | Morgan | |
| 2021/0001986 A1* | 1/2021 | Harcup | B64D 11/0606 |
| 2021/0188441 A1 | 6/2021 | Lee et al. | |

FOREIGN PATENT DOCUMENTS

| | | |
|---|---|---|
| EP | 3549865 B1 | 1/2021 |
| WO | 2021170507 A1 | 9/2021 |

OTHER PUBLICATIONS

European Patent Office, Extended European Search Report received in EP Application No. 24169423.1, Jun. 28, 2024, 7 pages.

* cited by examiner

*Primary Examiner* — Ashesh Dangol
(74) *Attorney, Agent, or Firm* — Suiter Swantz IP

(57) ABSTRACT

The present disclosure provides a seat layout for business class in an aircraft. The layout includes a first row of seats that are angled toward a centerline, and a second row positioned directly behind the first row of seats, the second row including seats that are laterally adjacent and parallel to the centerline. Each seat includes a console positioned to one side of the respective seat, wherein the consoles of the first row form footwells for the seats of the second row. The seats in the second row are grouped to form a sharable space for passengers traveling together. The disclosure further provides a seat layout for a widebody aircraft including a sharable space positioned at the aft end of the center column.

11 Claims, 5 Drawing Sheets

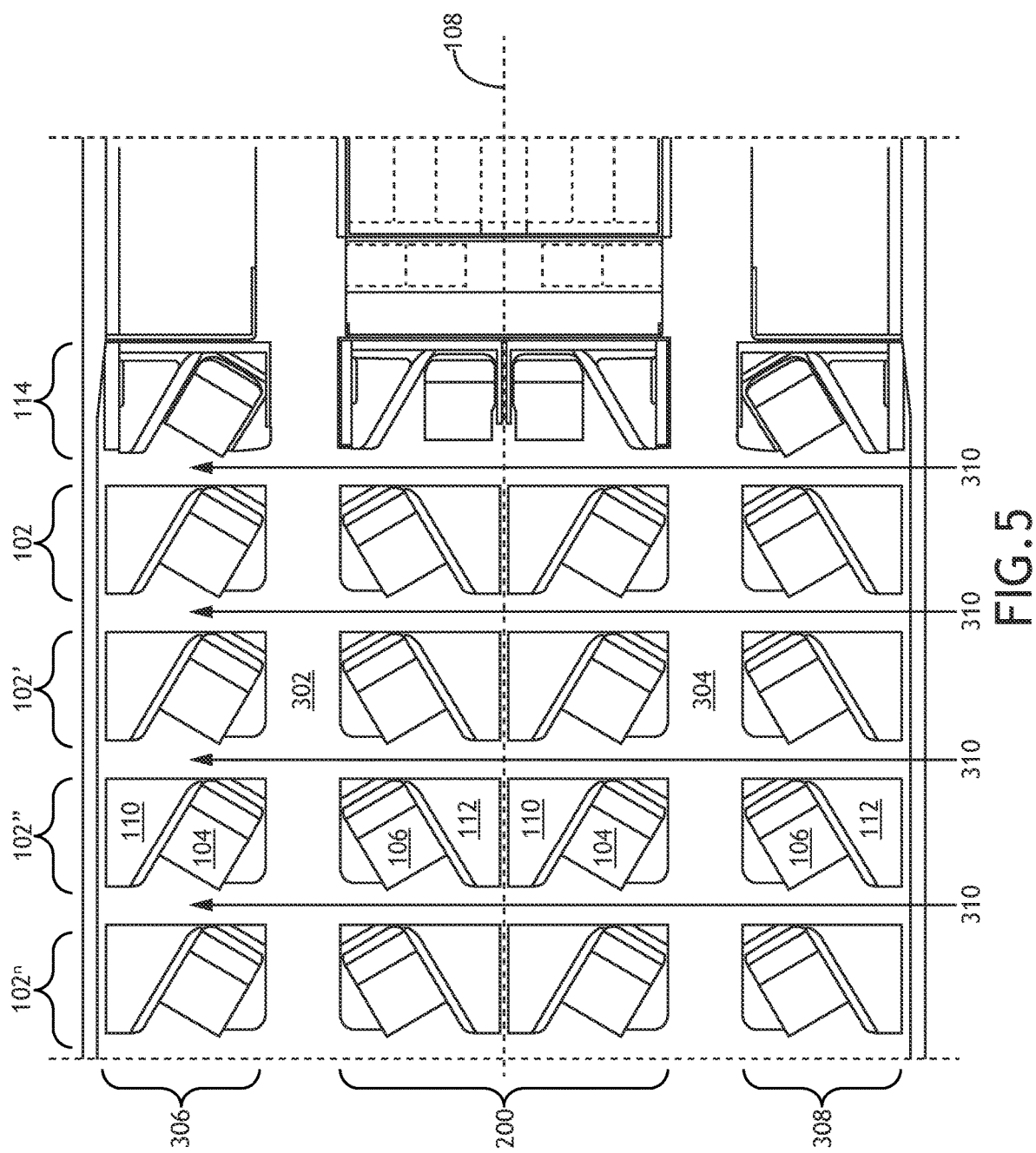

BUSINESS CLASS SEATING ARRANGEMENT WITH COMPANION TRAVEL SEATING GROUP

TECHNICAL FIELD AND BACKGROUND

The present disclosure relates generally to passenger seat layouts for aircraft cabins, and more particularly, to a reverse herringbone seating layout including a travel companion seating group.

Seats in aircraft passenger cabins are typically arranged in rows and columns. Columns are typically oriented parallel to the aircraft longitudinal axis, while rows are typically oriented transverse to the aircraft longitudinal axis. Columns are typically separated by longitudinal aisles. Narrow body aircraft may include a single longitudinal aisle separating two columns, whereas wide body aircraft may include two longitudinal aisles separating three columns. In wide body aircraft, seat rows in the center column may include a greater number of seats as compared to rows in the outboard columns considering the desire to provide direct access for each seat from one of the longitudinal aisles.

Passenger seats within each row and column may be oriented at different angles depending on the seating class. Per the Federal Aviation Administration (FAA), passenger seats may be classified as forward facing or side-facing depending on the seat installation angle. Different certification criteria are provided depending on the installation angle from the aircraft centerline as measured from the forward direction. Forward facing seats include any seat installed at an angle up to and including 18 degrees. Side facing seats include any seat installed at an angle greater than 18 degrees. Oblique seats, which are a subset of side facing seats, include any seat installed at an angle greater than 18 degrees up to and including 45 degrees.

Conventional layouts of passenger seats, and in particular business class passenger seats, include forward facing, herringbone, and reverse herringbone layouts. In each of these layouts, each row is configured the same as at least one other row such that rows or row pairings can be repeated along the longitudinal length of the cabin. While repetition provides for uniformity and cost savings, some cabin layouts would benefit from at least one unique seat row.

Therefore, it would be desirable to provide a unique layout of seats that balances seat density and lie flat all-access configurations, as well as provides improved travel companion capabilities.

BRIEF SUMMARY

To achieve the foregoing and other advantages, according to a first aspect, the present disclosure provides a seat layout for business class in an aircraft. The seat layout includes a first row including a first seat and a second seat, each of the first seat and the second seat oriented at an angle toward a centerline of the seat layout, the first row further including a first console associated with the first seat and a second console associated with the second seat, the first console and the second console positioned laterally adjacent. The seat layout further includes a second row positioned directly behind the first row, the second row including a third seat and a fourth seat positioned laterally adjacent, each of the third seat and the fourth seat oriented parallel to the centerline, and the second row further including a third console associated with the third seat and a fourth console associated with the fourth seat, the third console and the fourth console positioned laterally spaced apart.

In some embodiments, each of the first, second, third, and fourth seats is configured to adjust between an upright position and a lie flat position, the first console forms a footwell for use by the third seat, the second console forms a footwell for use by the fourth seat, and neither of the third console and the fourth console forms a footwell for use with any other seat.

In some embodiments, the second row includes space shared by the third seat and the fourth seat, and the seat layout further comprises a privacy divider configured to deploy to a position between the third seat and the fourth seat to divide the shared space.

In some embodiments, each of the first seat and the second seat is installed at an angle, relative to the centerline, up to and including 18 degrees.

In some embodiments, each of the first seat and the second seat is installed at angle, relative to the centerline, greater than 18 degrees up to and including 45 degrees.

In some embodiments, the seat layout is symmetrical about the centerline.

According to another aspect, the present disclosure provides a layout for business class in an aircraft. The layout includes a first longitudinal aisle and a second longitudinal aisle spaced apart and parallel to the first longitudinal aisle. The layout further includes a center column of seats positioned between the first longitudinal aisle and the second longitudinal aisle. The center column of seats includes a first row including a first seat and a second seat, each of the first seat and the second seat oriented at an angle toward a centerline of the center column, the centerline parallel to each of the first longitudinal aisle and the second longitudinal aisle, the first row further including a first console associated with the first seat and a second console associated with the second seat, the first console and the second console positioned laterally adjacent. The center column of seats further includes a second row positioned directly behind the first row, the second row including a third seat and a fourth seat positioned laterally adjacent, each of the third seat and the fourth seat oriented parallel to the centerline, and the second row further including a third console associated with the third seat and a fourth console associated with the fourth seat, the third console and the fourth console positioned laterally spaced apart. The center column of seats further includes at least one additional row positioned forward of the first row, the at least one additional row having the same configuration as the first row.

In some embodiments, each of the first, second, third, and fourth seats is configured to adjust between an upright position and a lie flat position, the first console forms a footwell for use by the third seat, the second console forms a footwell for use by the fourth seat, and neither of the third console and the fourth console forms a footwell for use by any other seat.

In some embodiments, the second row is positioned at the aft end of the center column.

In some embodiments, a seat pitch between the first row and the second row is greater than a seat pitch between the first row and an adjacent row of the at least one additional row.

In some embodiments, the seat layout includes a privacy divider configured to deploy to a position between the third seat and the fourth seat.

In some embodiments, each of the first seat and the second seat is installed at an angle, relative to the centerline, up to and including 18 degrees.

In some embodiments, each of the first seat and the second seat is installed at angle, relative to the centerline, greater than 18 degrees up to and including 45 degrees.

In some embodiments, the layout is symmetrical about the centerline.

In some embodiments, the seat layout further includes a starboard column positioned across the first longitudinal aisle from the center column, the starboard column including a plurality of seat rows each including a single seat angled away from the centerline and a console positioned to a side of the single seat apart from the first longitudinal aisle. The seat layout further includes a port column positioned across the second longitudinal aisle from the center column, the port column including a plurality of seat rows each including a single seat angled away from the centerline and a console positioned to a side of the single seat apart from the second longitudinal aisle.

In some embodiments, a transverse passageway from the first longitudinal aisle to the second longitudinal aisle may be formed forward of each of the first row, the second row, and the at least one additional row. In embodiments, the transverse passageway may be closed by a partition.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 5 is a plan view of a layout for business class in a widebody aircraft, in accordance with at least one embodiments of the present disclosure.

DETAILED DESCRIPTION

Figure 1:
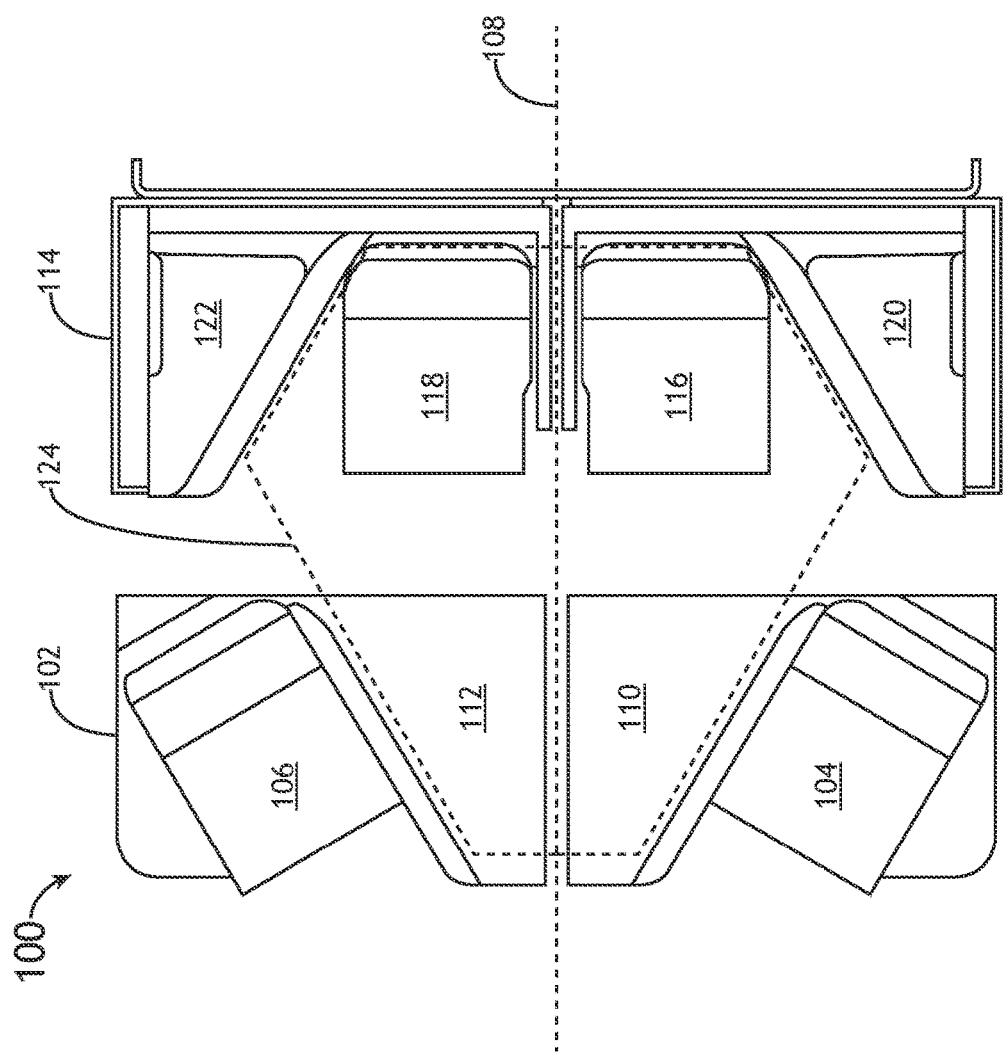
FIG. 1 is a plan view of a seat layout for business class in an aircraft, in accordance with at least one embodiment of the present disclosure, showing the seats in an upright position.

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides seat layouts, columns layouts, and cabin layouts for business class in an aircraft. In some embodiments, the layouts include a reverse herringbone configuration having a unique aft row in the center aisle to provide improved travel companion capabilities. In some embodiments, the unique aft row includes a center privacy divider configured to stow to provide a single shared space in the row and deploy to divide the space into two separate spaces. In some embodiments, the seats in the unique row are configured to adjust to lie flat and are positioned to form a large bed. The seat layouts, column layouts, and cabin layouts according to the present disclosure allow a unique opportunity for the airlines to offer a shared flight experience for passengers traveling together, among other benefits and advantages.

As used herein, the term "herringbone" refers to an arrangement of seats angled relative to the aircraft centerline. The term "herringbone" may refer to seats angled toward the nearest longitudinal aisle, whereas the term "reverse herringbone" may refer to seats angled away from the nearest longitudinal aisle. As used herein, the term "oblique seat" means any side facing seat installed at an angle greater than 18 degrees up to and including 45 degrees from the aircraft centerline. In a preferred embodiment, an oblique seat according to the present disclosure is installed at an angle of about 30 degrees. As used herein, the term "forward facing seat" means any seat installed at an angle up to and including 18 degrees from the aircraft centerline, regardless of whether the seat faces toward the front of the aircraft (i.e., forward facing) or toward the rear of the aircraft (i.e., aft facing). As used herein, the term "toes-in" means angled toward the nearest longitudinal aisle while the term "toes-out" means angled away from the nearest longitudinal aisle. For a starboard or port column, an oblique seat oriented "toes-out" means angled toward the fuselage wall whereas an oblique seat oriented "toes-in" means angled toward the nearest longitudinal aisle. For a center column, a pair of oblique seats oriented "toes-out" means seats converging in the direction of their head end whereas a pair of oblique seats oriented "toes-in" means seats converging in the direction of their foot end. The front of the aircraft and the direction of flight of the aircraft is toward the left of the page as viewed in the drawings. As used herein, the terms "nest" or "nesting" means to overlap in at least one of lateral and longitudinal directions.

FIG. 1 illustrates a seat layout for business class in an aircraft is shown generally at 100. The seat layout 100 includes a first row 102 including a first seat 104 and a second seat 106 positioned in longitudinal alignment. Each of the first seat 104 and the second seat 106 is oriented at an angle toward a centerline 108 of the seat layout, for instance a centerline coextensive with the aircraft centerline. Each of the first seat 104 and the second seat 106 is configured to adjust between an upright position for taxi, takeoff, and landing (TTOL) and a reclined position during flight. In some embodiments, the reclined position is a lie flat position in which the seat is substantially horizontal. The seats 104, 106 may also be configured to adjust to a number of intermediate positions between fully upright and fully reclined, for instance a lounge position.

The first row 102 further includes a first console 110 associated with the first seat 104 and a second console 112 associated with the second seat 106. As shown, the first console 110 is positioned on the inboard side of the first seat 104 and the second console 112 is positioned on the inboard side of the second seat 106. As such, the first console 110 and the second console 112 are positioned directly laterally adjacent and apart from the longitudinal aisles, as discussed further below. In some embodiments, each console may be for use by the nearest laterally adjacent seat. In other embodiments, each console may be configured for use by the nearest aft-positioned longitudinally adjacent seat.

The seat layout 100 further includes a second row 114 positioned directly behind the first row 102. The second row 114 includes a third seat 116 and a fourth seat 118 positioned laterally adjacent. Each of the third seat 114 and the fourth seat 116 are oriented parallel to the centerline 108. The second row 114 further includes a third console 120 associated with the third seat and a fourth console 122 associated with the fourth seat. The third console 120 and the fourth console 122 are positioned laterally spaced apart, separated by the third and fourth seats 116, 118. The third seat 116 and the fourth seat 118 are also configured to adjust between an upright position and a lie flat position through at least one intermediate position. By positioning the seats 116, 118 in the second row 114 side-by-side, a shared space 124 is formed in the second row 114 usable by travel companions.

Figure 2:
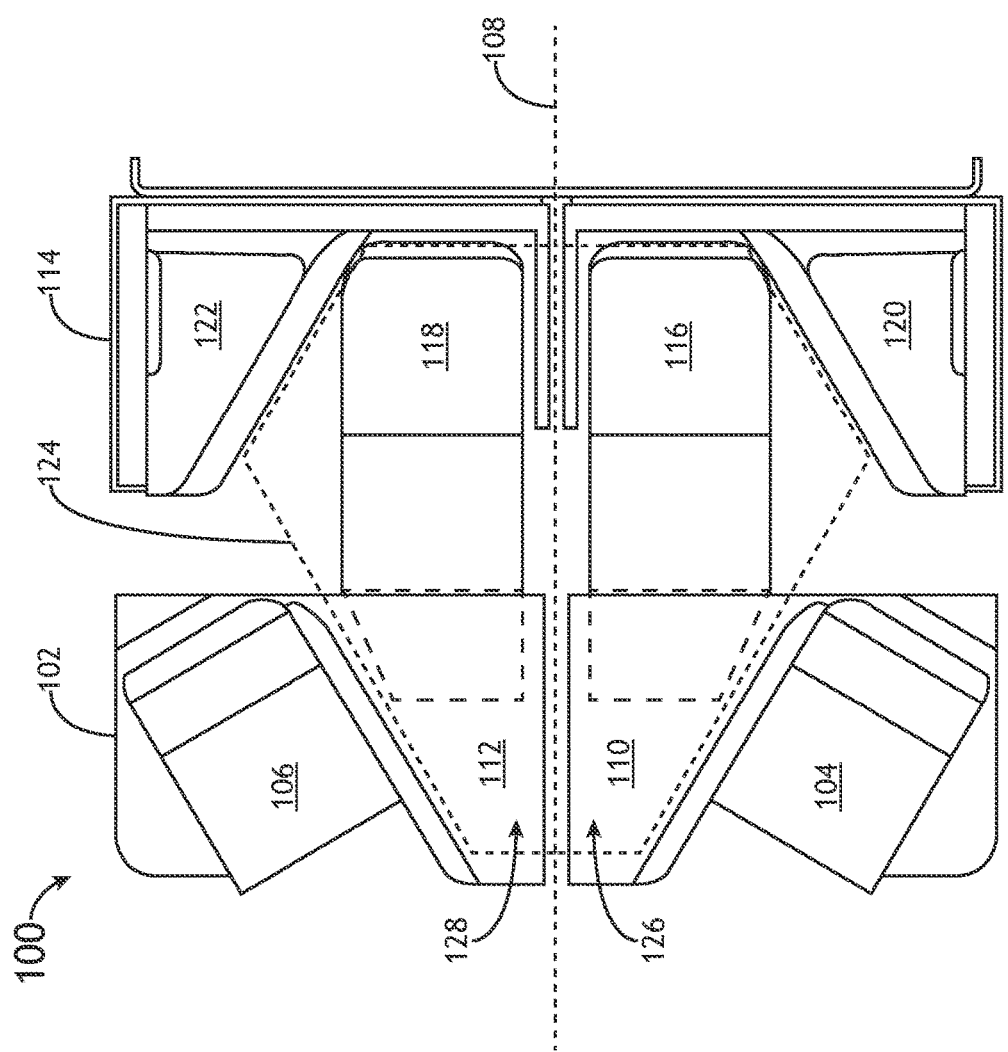
FIG. 2 is a plan view of the seat layout of FIG. 1, showing the seats in the second row in a lie flat position.

FIG. 2 illustrates the seat layout 100 of FIG. 1 showing the third seat 116 and the fourth seat 118 in their life flat condition. The first console 110 forms a first footwell 126 for use by the third seat 116, and the second console 112 forms a second footwell 128 for use by the fourth seat 118. In some embodiments, the footwells 126, 128 are positioned below a horizontal shelf implemented as a table, desk, etc. When the third seat 116 and the fourth seat 118 are in their lie flat condition, at least the leg rest portion of each seat may extend into the footwell space. In some embodiments, the seats 116, 118 may translate to meet an ottoman positioned in the footwells 126, 128. When the third seat 116 and the fourth seat 118 are fully reclined, the two seats may form a substantially continuous bed which occupies at least a portion of the shared space 124. When the second row 114 is positioned as the last or aft row in a column, neither the third console 120 nor the fourth console 122 forms a footwell for use with any other seat.

Figure 3:
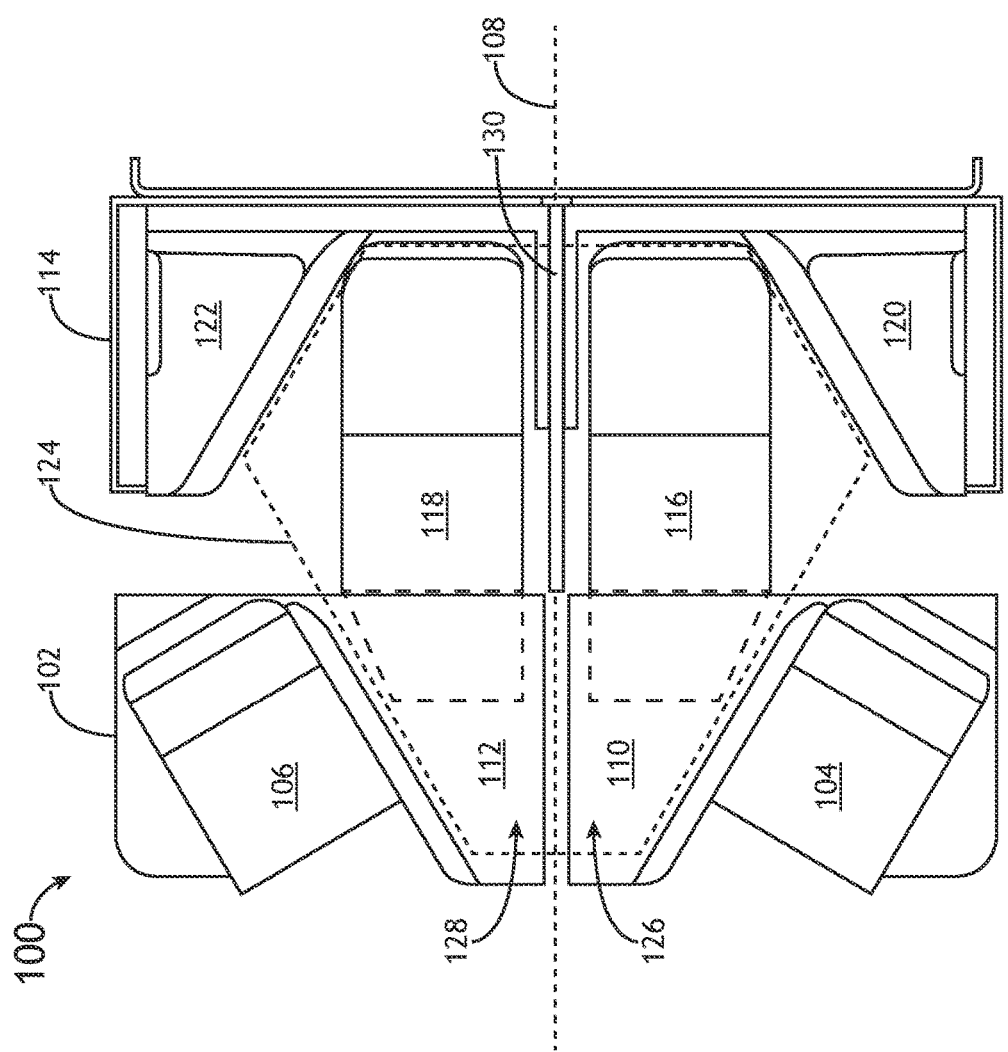
FIG. 3 is a plan view of the seat layout of FIG. 2, showing a partition deployed to separate the seats in the second row.

FIG. 3 illustrates the seat layouts of FIGS. 1 and 2 further including a privacy divider 130. In some embodiments, the privacy divider 130 is moveable between a stowed position and a deployed position. The stowed position may be aft of the second row 114, forward of the second row 114, or within the confines of the second row 114. In some embodiments, the privacy divider 130 is configured to raise and lower vertically such that when raised, the shared space 124 is separated into two spaces, and when lowered to at least bed level, the shared space 124 becomes a single space and the bed substantially a single large bed. In some embodiments, the privacy divider 130 is configured to translate horizontally, for instance from between the first console 110 and the second console 112, or from a garage behind the second row 114.

In some embodiments, the first seat 104 and the second seat 106 are installed at an angle, relative to the centerline, up to and including 18 degrees. As shown, the first seat 104 and the second seat 106 are installed at equal but opposite angles about the centerline 108 to provide a toes-in or reverse herringbone arrangement. Thus, the first seat 104 and the second seat 106 may both be classified as forward facing, although at an angle to the centerline 108. In some embodiments, each of the first seat 104 and the second seat 106 may be installed at angle, relative to the centerline, greater than 18 degrees up to and including 45 degrees. Thus, the first seat 104 and the second seat 106 may both be classified as side facing, and more specifically, oblique. Angling the first seat 104 and the second seat 106 allows the consoles 110, 112 to be positioned therebetween providing the footwell locations for the third seat 116 and the fourth seat 118 in the second row 114. In some embodiments, the seat layout 100 is symmetrical about the centerline 108.

Figure 4:
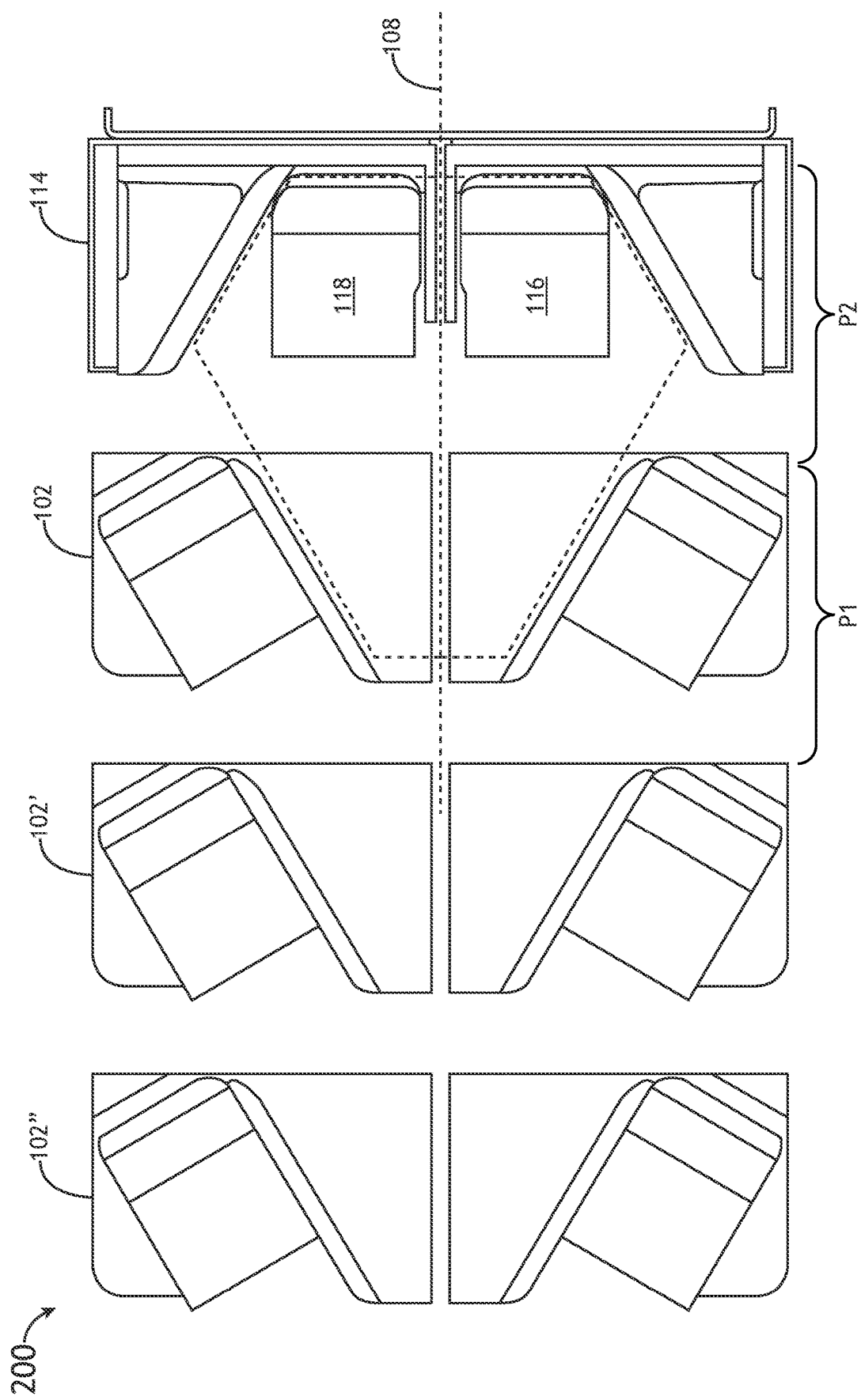
FIG. 4 is a plan view of a seat layout for a center column for an aircraft, in accordance with at least one embodiment of the present disclosure.

FIG. 4 illustrates the seat layout included in a center column 200, for example, for a wide body aircraft. The center column 200 may be positioned between longitudinal aisles parallel to an aircraft longitudinal axis. The first row 102 and second row 114 are as discussed above. The center column 200 further includes at least one additional row 102', 102" positioned forward of the first row 102, the at least one additional row 102', 102" has the same seat and console configuration as the first row 102. In some embodiments, to account for the bed lengths of the parallel third seat 116 and fourth seat 118 orientations, the seat pitch of the second row 114, measured form the back of the seat in one row to the back of the seat in the adjacent row, may be greater as compared to seat pitch through the rest of the same seating class. In other words, the seat pitch P1 between adjacent like rows in the first row 102 forward is less than the seat pitch P2 between the first row 102 and the second row 114. In some embodiments, the seat pitch difference is less than one foot, more preferable less than about 6 inches.

FIG. 5 illustrates a layout 300 for a business class cabin. The layout 300 includes a first longitudinal aisle 302 and a second longitudinal aisle 304 spaced apart and parallel to the first longitudinal aisle 302. The center column 200, as discussed above, is positioned between the first longitudinal aisle 302 and the second longitudinal aisle 304 and includes the seat layout as discussed above (i.e., last or second row 114 and repeating like first rows 102, 102', 102" . . . 102").

The layout 300 further includes a starboard column 306 positioned across the first longitudinal aisle 302 from the center column 200. The starboard column 306 includes a plurality of seat rows that correspond in longitudinal position to the seat rows 114, 102', 102", 102". Each seat row of the starboard column 306 includes a single seat angled away from the centerline 108 and a console positioned to a side of the single seat apart from the first longitudinal aisle 302. For repetition, uniformity, and cost savings throughout the cabin, each seat and console configuration in the starboard column 306 may be the same as the first seat 104 and the first console 110 configuration found in the center column 200.

The layout 300 further includes a port column 308 positioned across the second longitudinal aisle 304 from the center column 200. The port column 308 includes a plurality of seat rows that also correspond in longitudinal position to the seat rows 114, 102', 102", 102". Each seat row of the port column 308 also includes a single seat angled away from the centerline 108 and a console positioned to a side of the single seat apart from the second longitudinal aisle 304. For repetition, uniformity, and cost savings throughout the cabin, each seat and console configuration in the port column 308 may be the same as the second first seat 106 and the second console 112 configuration found in the center column 200.

In some embodiments, a transverse passageway 310 extending from the first longitudinal aisle 302 to the second longitudinal aisle 304 may be formed forward of each of the first row 102, the second row 114, and the at least one additional row 102', 102", 102". In use, the transverse passageways 310 provide direct seat access from one of the longitudinal aisles 302, 304.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed:

1. A seat layout for business class in an aircraft, comprising:
    a first row including a first seat and a second seat, each of the first seat and the second seat oriented at an angle toward a centerline of the seat layout, the first row further including a first console associated with the first seat and a second console associated with the second seat, the first console and the second console positioned laterally adjacent;
    a second row positioned directly behind the first row, the second row including a third seat and a fourth seat positioned laterally adjacent, each of the third seat and the fourth seat oriented parallel to the centerline, and the second row further including a third console associated with the third seat and a fourth console associated with the fourth seat, the third console and the fourth console positioned laterally spaced apart;
    a first transverse passageway positioned directly forward of the first row;
    a second transverse passageway positioned directly forward of the second row; and
    a privacy divider configured to deploy between the third seat and the fourth seat to block the second transverse passageway;
    wherein:
    each of the first seat, the second seat, the third seat, and the fourth seat is configured to adjust between an upright position and a lie flat position;
    the first console forms a footwell for use by the third seat;
    the second console forms a footwell for use by the fourth seat; and
    neither of the third console and the fourth console forms a footwell for use by any other seat.

2. The seat layout according to claim 1, wherein each of the first seat and the second seat is installed at an angle, relative to the centerline, up to and including 18 degrees.

3. The seat layout according to claim 1, wherein each of the first seat and the second seat is installed at an angle, relative to the centerline, greater than 18 degrees, and up to and including 45 degrees.

4. The seat layout according to claim 1, wherein the seat layout is symmetrical about the centerline.

5. A layout for business class in an aircraft, comprising:
    a first longitudinal aisle;
    a second longitudinal aisle spaced apart and parallel to the first longitudinal aisle;
    a center column of seats positioned between the first longitudinal aisle and the second longitudinal aisle, the center column of seats comprising:
        a first row including a first seat and a second seat, each of the first seat and the second seat oriented at an angle toward a centerline of the center column, the centerline parallel to each of the first longitudinal aisle and the second longitudinal aisle, the first row further including a first console associated with the first seat and a second console associated with the second seat, the first console and the second console positioned laterally adjacent;
        a second row positioned directly behind the first row, the second row including a third seat and a fourth seat positioned laterally adjacent, each of the third seat and the fourth seat oriented parallel to the centerline, and the second row further including a third console associated with the third seat and a fourth console associated with the fourth seat, the third console and the fourth console positioned laterally spaced apart; and
        at least one additional row positioned forward of the first row, the at least one additional row having the same configuration as the first row;
    a first transverse passageway positioned directly forward of the first row and extending from the first longitudinal aisle to the second longitudinal aisle;
    a second transverse passageway positioned directly forward of the second row and extending from the first longitudinal aisle to the second longitudinal aisle; and
    a privacy divider configured to deploy between the third seat and the fourth seat to block the second transverse passageway;
    wherein:
    each of the first seat, the second seat, the third seat, and the fourth seat is configured to adjust between an upright position and a lie flat position;
    the first console forms a footwell for use by the third seat;
    the second console forms a footwell for use by the fourth seat; and neither of the third console and the fourth console forms a footwell for use by any other seat.

6. The layout according to claim 5, wherein the second row is positioned at an aft end of the center column.

7. The layout according to claim 5, wherein a seat pitch between the first and second rows is greater than a seat pitch between any adjacent rows including the first row and the at least one additional row.

8. The layout according to claim 5, wherein each of the first seat and the second seat is installed at an angle, relative to the centerline, up to and including 18 degrees.

9. The layout according to claim 5, wherein each of the first seat and the second seat is installed at an angle, relative to the centerline, greater than 18 degrees, and up to and including 45 degrees.

10. The layout according to claim 5, wherein the layout is symmetrical about the centerline.

11. The layout according to claim 5, further comprising:
a starboard column positioned across the first longitudinal aisle from the center column, the starboard column including a plurality of seat rows each including a single seat angled away from the centerline and a console positioned to a side of the single seat apart from the first longitudinal aisle; and
a port column positioned across the second longitudinal aisle from the center column, the port column including a plurality of seat rows each including a single seat angled away from the centerline and a console positioned to a side of the single seat apart from the second longitudinal aisle.

* * * * *